Nov. 9, 1943.  J. W. WINTER  2,333,968
BOILER CONNECTION
Filed Dec. 18, 1940  2 Sheets-Sheet 1
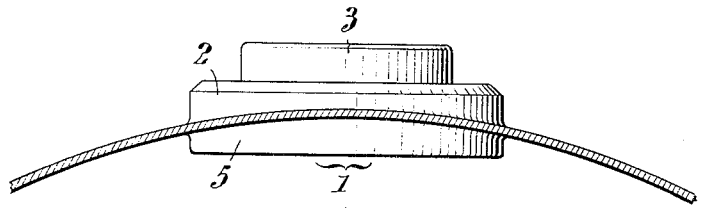
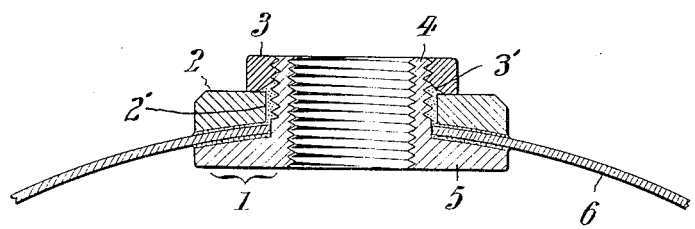
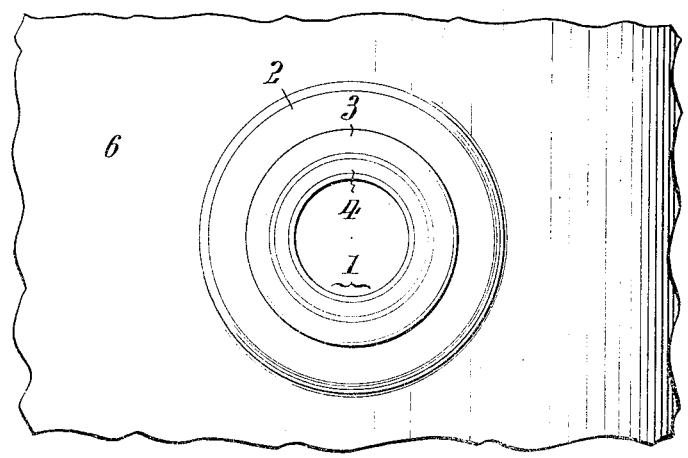
WITNESSES:
Hubert Fuchs
George L. Comly
INVENTOR:
Joseph William Winter,
BY Paul & Paul
ATTORNEYS.

Nov. 9, 1943.   J. W. WINTER   2,333,968
BOILER CONNECTION
Filed Dec. 18, 1940   2 Sheets-Sheet 2
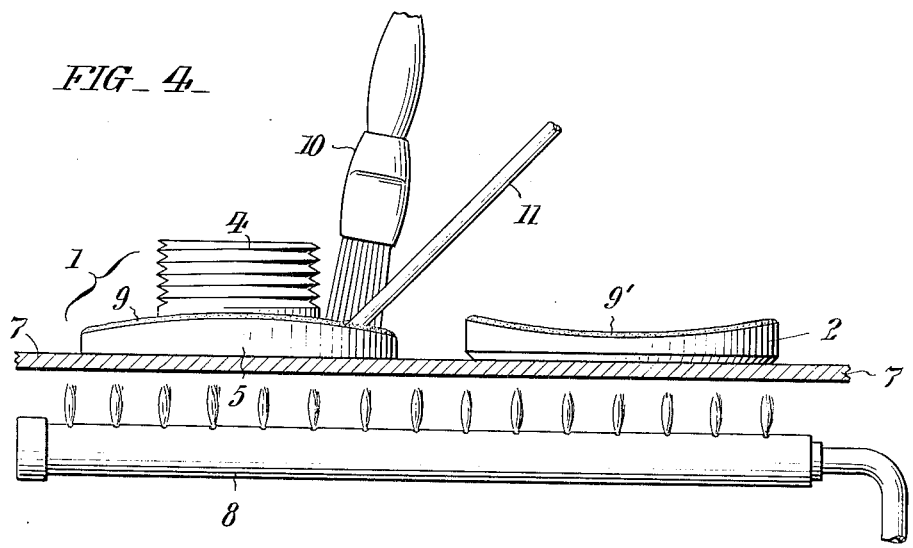
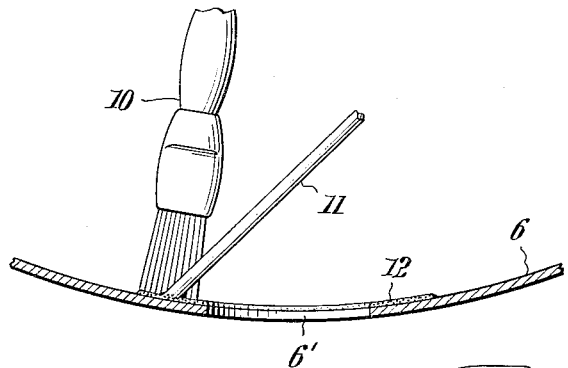
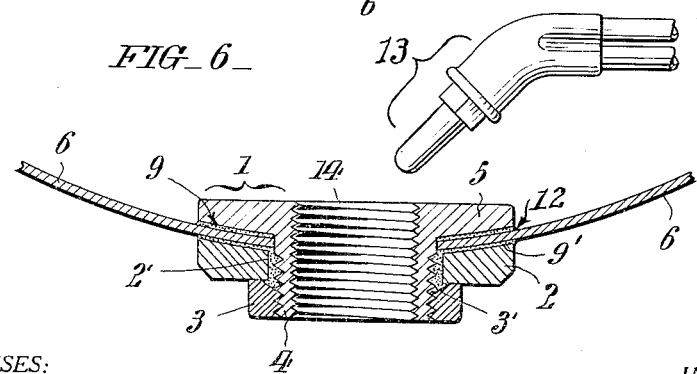

Patented Nov. 9, 1943

2,333,968

UNITED STATES PATENT OFFICE 2,333,968

BOILER CONNECTION

Joseph William Winter, Penfield, Pa., assignor, by mesne assignments, to Asbestos and Metal Industries Corporation, Dover, Del., a corporation of Delaware Application December 18, 1940, Serial No. 370,617

1 Claim. (Cl. 113—112)

This invention relates generally to boiler connections and more specifically to boiler connections mounted in copper boilers formed of copper of a high tensile strength.

Heretofore such connections or threaded pipe outlets have for reasons of design or method of attaching to a non-ferrous tank been unsatisfactory after a short time in service. In certain types of soldered connections in combination with a gasket or packing to secure it against leakage, the packing would fail or the compression nut loosen with consequent leakage. In an attempt to overcome this weakness, spuds were developed to attach to the tank with high temperature brazing solders or welding. While this type cured certain faults in the soldered type, it introduced other weakening factors so that the net result was also unsatisfactory.

In the latter type, the importance of making the contact surfaces of the spud to conform to the radius of the tank to which it was attached was not realized, with the result that the shell was deformed to match the flat surface of the spud, resulting in a departure from the true radius of the tank. Under pulsating pressures to which the tank is subjected in service the shell tends again to assume its true radius with the result that there is a continual local bending of the metal resulting in fatitgue and eventual rupture. Moreover, this effect is localized and intensified by reason of the annealing effect of the required brazing or welding temperatures in attaching the spud.

The primary aim of this invention is to effectively overcome the noted disadvantages by the novel method and means herein described, without any distortion of the shell of the tank from the true circle or dependence on a gasket with a compression nut to prevent leakage, while the sealing and bonding of the spud to the base structure is accomplished without resort to high temperature soldering or welding.

There are important results accomplished by this invention: First, the prevention of distortion of the sheet metal, from which the boiler shell or tank is made, whereby development of fatigue therein is eliminated. Second, inasmuch as the instant method does not involve any temperature above 500° F. there is no appreciable departure from the original tensile strength of the non-ferrous metal used, which is around 45,000 lbs. per square inch, and upwards for sheet copper, whereas under prevailing practice copper boilers or tanks, when fitted with a brazed or welded spud, the drop in tensile strength commonly is between 26,000 and 30,000 pounds. Third, the whole assembly being metallically integrated to the boiler shell, eliminates the necessity for a leakage preventing gasket and associated compression nut.

The hereinafter described invention is further directed to the provision of a boiler connection which will not weaken the boiler wall but will have all of the advantages of a brazed connection.

Another object of this invention is the provision of a gasketless boiler connection which is especially suited for boilers made of high tensile strength sheet copper.

Still further advantages inhering to this invention will become apparent from the following description of a preferred embodiment thereof which is illustrated by the accompanying drawings.

Fig. 1 shows a plan or top view of a boiler connection embodying the invention described below.

Fig. 2 shows a side elevation of the device shown in Fig. 1; and,

Fig. 3 shows a transverse section of the device illustrated in Fig. 1.

Figs. 4, 5 and 6 are schematic illustrations showing a preferred means for reducing the instant invention to practice, the same being hereinafter more particularly explained.

The boiler connection as best understood from Figs. 1-3 of the drawings is made up of three elements which are integrated in assembly by a soldering process which is described in detail below. These elements include a base member 1, a top member 2, and a retaining ring 3 having an inward flare 3' for a purpose later explained. The base member 1 consists of an interiorly and exteriorly threaded tubular portion 4 having a flange 5 integrally formed thereon. This flange 5 is of a sufficient area to provide substantial surface contact with a boiler wall 6 to which the connection is applied. The boiler wall 6 has an opening formed therein to receive therethrough the tubular portion 4 of the base member 1, with the flange 5 on the inside of the boiler, and said flange having its upper face suitably shaped to conform with the curvature of the boiler wall 6. This conformatory surface contact between the boiler wall 6 and the flange 5, when soldered according to the hereinafter described method, avoids any loose motion or flexing of that portion of the boiler wall 6 in contact with the upper surface of the flange 5. The top member 2 is given a washer-like shape having its bottom face curved to conform to the outer curvature of the boiler wall 6, and its bore 2' of a diameter greater than that of the tubular portion 4, exteriorly, for a purpose later on explained. This top member 2 fits over the tubular portion 4 of the base member 1 as shown in Fig. 1. Thus the top member 2 and the flange 5 of the base member 1 clamp between them a substantial portion of the boiler wall 6, while complete surface contact is positively maintained by means of the curved contact surfaces of said two members. The two members 1 and 2 are held in position by a retaining ring 3 having screw engagement with the outside threads of the tubular portion 4 of the base member 1. When the retaining ring 3 is screwed down, as far as possible, on the tubular portion 4, the boiler connection is firmly held in position to the boiler.

The integration of the boiler connection composed of three separate elements 1, 2 and 3, with the boiler proper is accomplished by a soldering operation which avoids the necessity of any washers. It has been found in the practice of this invention that any alloy containing a high percentage of copper is satisfactory for the manufacture of the component parts 1, 2 and 3, of the boiler connection of this invention.

In the assembly of the component parts of the above described boiler connection, on reference to Fig. 4, it will be seen that the base member 1 and top member 2 are both inverted and placed on a hot-plate 7, conveniently heated by a gas burner 8, or with their curved surfaces upward. As soon as the members 1, 2, have attained a temperature of approximately 500° F. from the hot-plate 7, a thin fusible coating 9, 9', is spread over the respective curved surfaces by means of a soldering-brush 10, and wire solder 11. About the same time there is correspondingly applied to the inner surface of the boiler wall 6, around a hole 6' therein for passage of the connection part 4, a similar coating 12, Figs. 5 and 6, without heating the boiler wall 6 beyond the above specified temperature of about 500° F. The next step involves application of the base member 1, from the inside of the boiler wall 6, see Fig. 3, with its tubular portion 4 projected upwards through the hole 6', in said boiler wall; whereupon the top member 2, Figs. 1–3, is positioned on the outside of the boiler wall 6 over the tubular portion 4 aforesaid, and the retaining ring 3 screwed in place to initially clamp said parts together. The position of the boiler is now reversed or inverted, as shown in Fig. 6, so that the flange portion 5 of the base member 1 is located above the other elements 2, 3 of the connection; whereupon an appropriate torch 13 is applied so that the flame 14 thereof is directed towards the connection tubular portion 4 and member 2 and turned around so as to wholly heat said portion. By conduction through the members 1, 2 and 3, the flame 14 gradually effects melting of the respective coatings 9 and 12, with resultant melting of the solder and its flow into the bore 2' of the member 2, as well as the flare 3' of the retaining ring 3 and the exposed part of the external thread groove of the part 4, without the temperature of the boiler wall 6 becoming directly heated. During the progress of this last described step great care is exercised to prevent any heating of the boiler wall beyond the temperature of 500° F., to effect sweat-clamping and integration of the parts 1, 2, 3 and 6. When the solder has cooled it will be found that the boiler connection has become integrated into a unit which is firmly anchored by the retainer ring flare 3' to and integrally mounted on the boiler; whereas there has been no annealing or softening effect produced in the high tensile copper of the boiler sheet 6 in the vicinity of said boiler connection.

Furthermore, while the annealing effect of brazing was heretofore not serious, where the tensile strength of the copper sheet used in boiler construction was only about 32,000 pounds, boilers are now being made from copper sheet having a tensile strength of around 45,000 pounds and over; the above described invention avoids any excessive heat application to the copper boiler wall in the vicinity of the boiler connection, and this is of prime importance, when it is essential the high tensile strength of the boiler wall be preserved throughout the whole of said boiler if such strength is to be of value.

While I have described the above invention in some detail it will be obvious to one skilled in the art that modifications thereof may be made without departing from the spirit of the invention as hereinafter claimed.

Having thus described my invention, I claim:

The method of uniting a curvilinearly flanged tubular connection to the wall of a copper container of a tensile strength approximately about 45,000 lbs. per square inch, by aid of a confrontingly-related annular member having its inner face conformably curved, the bore of said annular member being greater than the exterior size of said connection tubular part, and a retainer ring, having an inner flare, threadedly-engageable with the tubular connection; said method comprising the successive steps of heating the tubular connection flange and annular member, with their respective curved surfaces upward, to a temperature of approximately 500° F.; applying a thin coating of solder by means of a suitable brush to the curved surfaces while so heated; similarly coating the inner surface of the boiler annularly around a hole provided therein for application of the tubular connection without exceeding the above specified temperature; allowing the aforesaid parts to cool; inserting the tubular connection in the container wall, from the inside thereof, with its coated flange in abutment therewith; applying the annular member over the tubular portion of the connection, from the outside against the container wall; applying the retainer ring with its flare inwards to the tubular connection and annular member together by rotating the retainer ring; inverting the container to position the connection flange above the annular member and retainer ring; directing and confining a heating flame to the connection, with maintenance of the container wall at a temperature below 500° F., to sweat by conduction the solder on the curved face of said flange and on the relatively confronting face of the annular member, for gravity flow by way of the annular member bore into the various crevises intermediate the component parts of the connection as well as into the retainer ring inner flare, whereby said parts are mutually intergrated and sealed to the container wall, while said wall is retained at substantially its original tensile strength adjacent the connection.

JOSEPH WILLIAM WINTER.